United States Patent
Khera (10) Patent No.: US 9,802,707 B2
(45) Date of Patent: Oct. 31, 2017

(54) SYSTEM, METHOD, AND APPARATUS FOR SMOKE MITIGATION

(71) Applicant: Jagtar S. Khera, Parrish, FL (US)

(72) Inventor: Jagtar S. Khera, Parrish, FL (US)

( * ) Notice: Subject to any disclaimer, the term of this patent is extended or adjusted under 35 U.S.C. 154(b) by 516 days.

(21) Appl. No.: 14/332,488

(22) Filed: Jul. 16, 2014

(65) Prior Publication Data

US 2015/0031277 A1    Jan. 29, 2015

Related U.S. Application Data (60) Provisional application No. 61/958,746, filed on Jul. 24, 2013.

(51) Int. Cl.

| | |
|---|---|
| *B64D 13/00* | (2006.01) |
| *B64D 25/00* | (2006.01) |
| *B64C 1/14* | (2006.01) |
| *G01C 5/00* | (2006.01) |
| *B64D 45/00* | (2006.01) |

(52) U.S. Cl.
CPC ............... *B64D 13/00* (2013.01); *B64C 1/14* (2013.01); *B64D 25/00* (2013.01); *B64D 2045/009* (2013.01); *G01C 5/005* (2013.01)

(58) Field of Classification Search
CPC .. B64D 13/00; B64D 2045/009; B64D 25/00; B64D 2013/0696; B64C 1/14; B64C 1/1407; B60H 1/00842; B60H 1/00835; B60H 1/245; B60H 1/262; B60J 7/1621; F24F 7/02; F24F 13/082; F24F 13/10; F24F 13/1426; F24F 13/1413; F24F 13/15; F24F 11/053; F24F 2011/0097; A62C 2/12; A62C 3/08; A62C 3/0257; G01C 5/005; G05D 7/01

USPC ... 454/76, 71, 257, 357, 342, 162, 358–360, 454/363, 365, 369
IPC ............. B64D 13/00,25/00; B64C 1/14; B60H 1/26; G05D 7/01

See application file for complete search history.

(56) References Cited

U.S. PATENT DOCUMENTS

| | | | | |
|---|---|---|---|---|
| 2,159,516 | A | * | 5/1939 | Ball ....................... B60H 1/262 16/370 |
| 2,460,604 | A | * | 2/1949 | Simcox ................. B64D 13/00 454/76 |
| 3,129,910 | A | * | 4/1964 | Smith .................... B64D 17/78 244/107 |

(Continued)

FOREIGN PATENT DOCUMENTS

EP            227255  A1  *  7/1987

*Primary Examiner* — Gregory Huson
*Assistant Examiner* — Daniel E Namay
(74) *Attorney, Agent, or Firm* — Larson & Larson, P.A.; Frank Liebenow (57) ABSTRACT

A smoke mitigation system for an aircraft includes an exhaust shutter in an upper region of a fuselage of the aircraft. The exhaust shutter has a closed position in which the exhaust shutter does not exchange air from outside of the fuselage with air inside of a passenger cabin that is within the fuselage and an open position in which the exhaust shutter exchanges air from outside of the fuselage and inside of the passenger cabin, thereby enabling escape of smoke from the passenger cabin. The system includes one or more devices for opening the exhaust shutter and a device for initiating opening of the exhaust shutter. The device for initiating opening of the exhaust shutter includes mechanisms for determining that it is safe to open the exhaust shutter.

13 Claims, 9 Drawing Sheets

(56) References Cited

U.S. PATENT DOCUMENTS

| | | | | |
|---|---|---|---|---|
| 3,323,438 A * | 6/1967 | Korff | | A62C 2/242 454/357 |
| 4,552,325 A * | 11/1985 | Bruensicke | | B64D 13/00 15/313 |
| 4,785,741 A * | 11/1988 | Gronow | | B60J 9/02 105/348 |
| 6,969,314 B2 * | 11/2005 | Misner | | B60H 1/249 137/512.1 |
| 7,624,732 B2 * | 12/2009 | Mitchell | | A62B 99/00 128/202.24 |
| 7,731,574 B2 * | 6/2010 | Milks | | B60J 7/1642 296/216.02 |
| 7,871,038 B2 * | 1/2011 | Space | | B64D 13/06 244/118.5 |
| 8,342,920 B2 * | 1/2013 | Tanner | | B64D 13/02 244/1 N |
| 8,567,721 B2 * | 10/2013 | Voss | | B64C 1/18 244/118.5 |
| 8,740,147 B2 * | 6/2014 | Defrance | | B64D 29/06 244/129.4 |
| 9,067,680 B2 * | 6/2015 | Al-Alusi | | B64D 13/02 |
| 2004/0043722 A1 * | 3/2004 | Richter | | E04D 13/0354 454/358 |
| 2004/0113016 A1 * | 6/2004 | Eveker | | B64C 1/14 244/129.5 |
| 2004/0127154 A1 * | 7/2004 | Omiya | | B60H 1/249 454/162 |
| 2004/0142654 A1 * | 7/2004 | Stammer | | F24F 7/00 454/357 |
| 2006/0266887 A1 * | 11/2006 | Holder | | G05D 7/014 244/129.5 |
| 2007/0089746 A1 * | 4/2007 | Mitchell | | A62B 99/00 128/205.15 |
| 2008/0139101 A1 * | 6/2008 | Bickel | | B60H 1/262 454/136 |
| 2009/0029643 A1 * | 1/2009 | Reed | | E04D 13/03 454/359 |
| 2009/0133332 A1 * | 5/2009 | Nielsen | | A62B 3/00 49/195 |
| 2009/0217608 A1 * | 9/2009 | Braun | | B60H 1/262 52/302.1 |
| 2010/0056035 A1 * | 3/2010 | Hua | | B60H 1/262 454/139 |
| 2010/0096035 A1 * | 4/2010 | Appleby | | B64D 13/00 137/899.2 |
| 2010/0096503 A1 * | 4/2010 | Tanner | | B64D 13/02 244/129.4 |
| 2010/0291852 A1 * | 11/2010 | Steinert | | B64D 13/02 454/71 |
| 2011/0147633 A1 * | 6/2011 | Schiek | | B64D 13/00 251/298 |
| 2012/0126061 A1 * | 5/2012 | Raposeiro | | B64D 13/00 244/130 |
| 2012/0148387 A1 * | 6/2012 | Labrecque | | F04D 25/14 415/148 |
| 2013/0072100 A1 * | 3/2013 | Bosman | | B60H 1/248 454/76 |
| 2013/0084791 A1 * | 4/2013 | Al-Alusi | | B64D 13/02 454/76 |
| 2013/0168502 A1 * | 7/2013 | Da Silva | | B64D 41/00 244/53 B |
| 2014/0057543 A1 * | 2/2014 | Kim | | B60H 1/249 454/165 |

* cited by examiner

SYSTEM, METHOD, AND APPARATUS FOR SMOKE MITIGATION

CROSS-REFERENCE TO RELATED APPLICATION

This application claims the benefit of U.S. provisional application No. 61/958,746, filed Jul. 24, 2013, the disclosure of which is incorporated by reference.

FIELD

This invention relates to the field of emergency systems and more particularly to a system for mitigating smoke from an aircraft.

BACKGROUND

There have been many different levels of accidents related to aircraft, some resulting in injury and death. In some circumstances, there is great loss of life and not much hope for the passengers, especially in mid-air collisions, terrorist acts (e.g. Pan-American flight over Lockerby), and some violent crash landings.

In most airline-related events, many of the reported injuries and deaths are directly related to smoke, either due directly to inhalation of the smoke or due indirectly to the smoke from lack of visibility and confusion. Many airline-related events are results of leaks in fuel or other fluids (e.g. hydraulic fluids). When such leaks occur, the fluids often contact hot-running components such as jet engines, gasoline engines, motors, actuators, etc., causing the leaking fluids to either emit mass amounts of fumes, or to ignite, causing more heat and fumes. Most materials have the potential of causing smoke and/or flame, such as, smoldering fabrics, plastics exposed to high temperatures, etc.

Historical data from the aviation industry shows that many accidents involve such leaks. In most commercial aircraft, fuel lines, storage, and hydraulic systems are routed beneath the floor of the passenger cabins. Even though such aircraft typically have fire suppression systems, these fire suppression systems lack effectiveness for larger leaks. There is also potential for re-ignition of the leaking material. Further, large amounts of smoke are generated before fire suppression systems have extinguished relatively small fires, filling the passenger cabin with smoke in a matter of a few seconds. Aviation data indicates that most of the casualties of such events are caused by smoke inhalation. Further, in the few short minutes that the cabin fills with smoke, panic and confusion further leads to injuries such as broken limbs, concussion, etc. Flight crews are typically ineffective in such situations, hampered by the smoke as well as the panic of the passengers.

In many prior accidents, the fire is extinguished, yet many people are injured or killed from the smoke, either directly from inhalation or indirectly from fear and panic.

What is needed is a system that will alleviate fumes from the passenger cabin of an aircraft, particularly as soon as the aircraft has landed.

SUMMARY

In one embodiment, a smoke mitigation system for an aircraft is disclosed including an exhaust shutter in an upper region of a fuselage of the aircraft (the upper region being one an opposite side of the fuselage than a side having landing gear). The exhaust shutter has a closed position in which the exhaust shutter does not exchange air from outside of the fuselage with air/smoke inside of a passenger cabin that is within the fuselage. The exhaust shutter has an open position in which the exhaust shutter exchanges air from outside of the fuselage and air/smoke inside of the passenger cabin, thereby enabling escape of smoke from the passenger cabin. The system includes one or more devices for opening the exhaust shutter and a device for initiating opening of the exhaust shutter. The device for initiating opening of the exhaust shutter includes devices for determining that it is safe to open the exhaust shutter.

In another embodiment, a method of mitigating smoke within an aircraft is disclosed including, upon detecting smoke in the aircraft, waiting for the aircraft to be at a location that is safe to deploy one or more exhaust shutters. The exhaust shutters are located in an upper region of a fuselage of the aircraft and are in fluid communication with a passenger cabin of the aircraft (e.g., the exhaust shutters allow gasses to be exchanged between within the fuselage and outside of the fuselage). The method includes initiating opening of the exhaust shutters to allow the smoke to escape through the exhaust shutters and to allow fresh air to enter into the passenger cabin through the exhaust shutters.

In another embodiment, apparatus for smoke mitigation in an aircraft is disclosed including several exhaust shutters in an upper region of a fuselage of the aircraft (the upper region defined as an opposite side of the fuselage than the side having landing gear). The exhaust shutters have a closed position in which each of the exhaust shutters does not exchange air from outside of the fuselage with air inside of a passenger cabin within the fuselage, and an open position in which each of the exhaust shutters do exchange air from the outside of the fuselage with air inside of the passenger cabin. When open, the exhaust shutters enabling escape of smoke from the passenger cabin. Each of the exhaust shutters is interfaced to an actuator that is configured to open its respective exhaust shutter. There is a mechanism for initiating operation of the actuators, operation of which results in opening of the exhaust shutters.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Exemplary, simplified aircraft systems are described for example purposes and it is fully understood that aircraft systems of various complexity exist, depending upon the size, configuration, and use of the aircraft. Although sample procedures are described, it is understood that various government bodies of various countries, working with airlines, will develop and certify the exact procedures to be operated during such emergencies, for example, the National Transportation Safety Board (NTSB) and the Federal Aviation Authority (FAA), etc.

It is important to seal the passenger cabin of an aircraft while traveling at certain altitudes and velocities. The following disclosure describes various tests that are performed before the passenger cabin is unsealed (e.g. exhaust shutters are opened), though many other tests for safe operation are anticipated and included here within.

Throughout this application, the term "mitigation" refers to lessening the force or intensity of something unpleasant (e.g. smoke), as in extreme circumstances, for example, when sufficient smoke causes vision and/or breathing problems of passengers of an aircraft.

Figure 1:
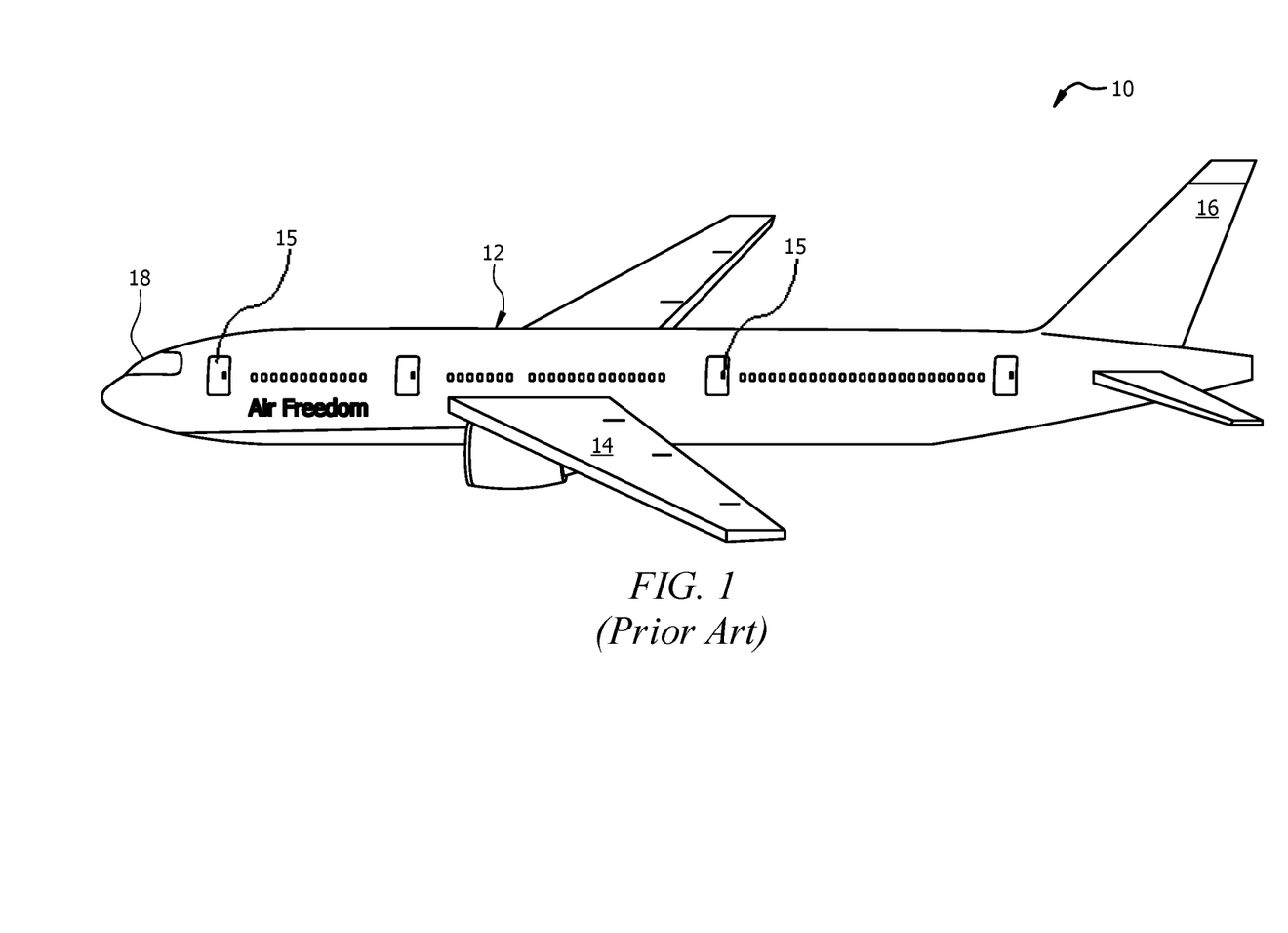
FIG. 1 illustrates a typical aircraft of the prior art.

Referring to FIG. 1 illustrates a typical aircraft 10 of the prior art is shown. The typical aircraft 10 of the prior art includes a fuselage 12, wings 14, a tail 16 and a cockpit 18 from where the operator(s) (e.g., pilots) operate the aircraft 10.

In many commercial aircraft 10, fuel and other flammable or reactive liquids are typically stored/located within the wings and/or beneath floor panels of the fuselage; below where passengers are typically situated. Many commercial aircraft 10 have fire/smoke detection systems (not shown) and fire extinguishing systems to douse any fire that starts in the engines and/or fuselage. Such extinguishing systems are often automatic, in that, after detecting the heat and/or smoke from a fire, the extinguishing systems automatically emits chemicals that are effective in extinguishing or, at least limiting the spread of fire and smoke. Some extinguishing systems are manually initiated by the operator/pilot after receiving a warning indication from a fire/smoke detector.

In general, the cabin in which people are transported is somewhat sealed, except for a few doors 15, typically used for access to the cabin and/or emergency escape. During flight, external air is brought into the cabin to provide the necessary oxygen for passengers to breath.

When a fire (or smoldering) occurs, the cabin quickly fills with dense smoke, displacing any oxygen that is within the cabin and greatly reducing visibility to passengers. The passengers quickly succumb to the smoke, leading to death unless the passengers are revived and given breathing assistance. Even those who are quick to drop to the floor where more oxygen is present, have difficulty finding their way to an exit due to the lack of visibility and confusion of other passengers. If the plane is on the ground, the doors 15 can be opened but the open doors provide only small amounts of breathable air and are usually difficult to find due to the greatly reduced visibility from smoke.

Figure 2:
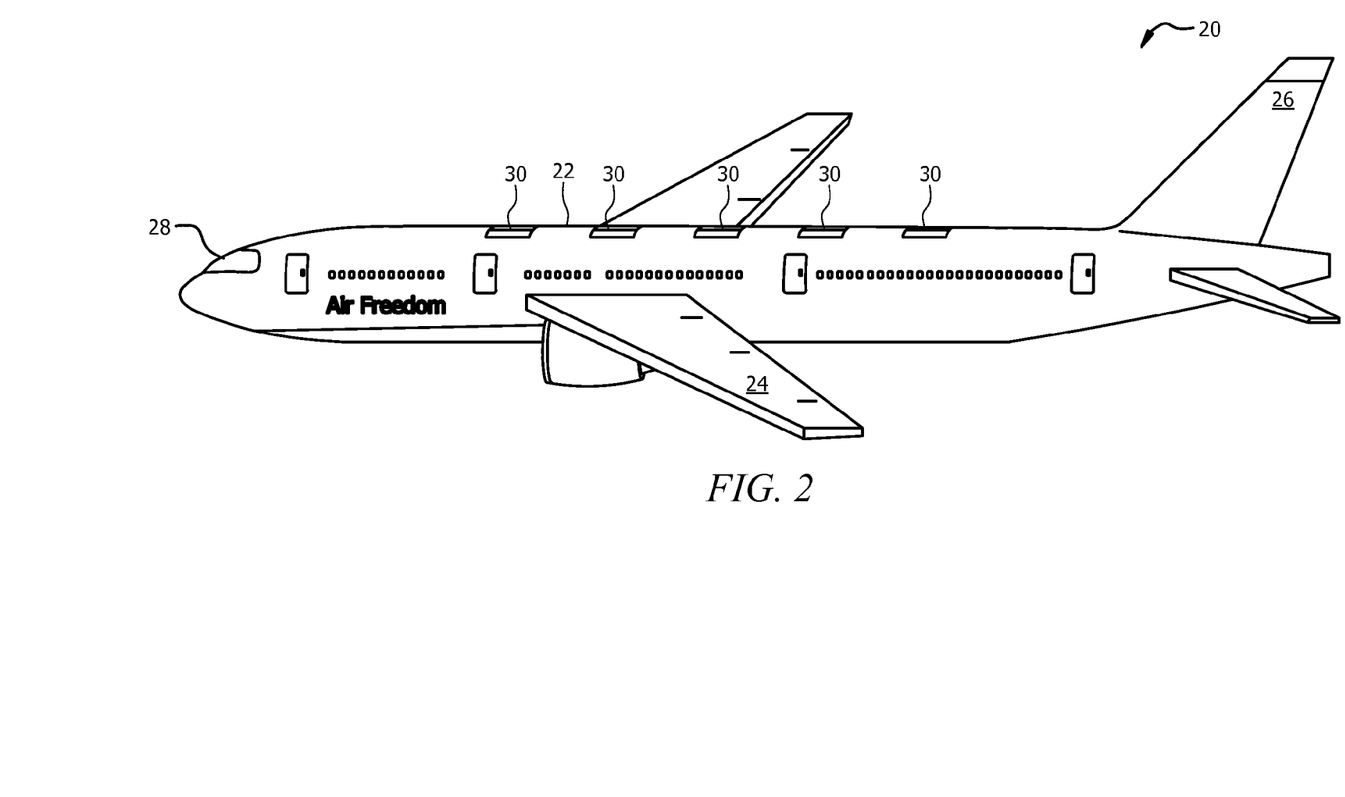
FIG. 2 illustrates an aircraft fitted with smoke exhaust shutters.
Figure 3:
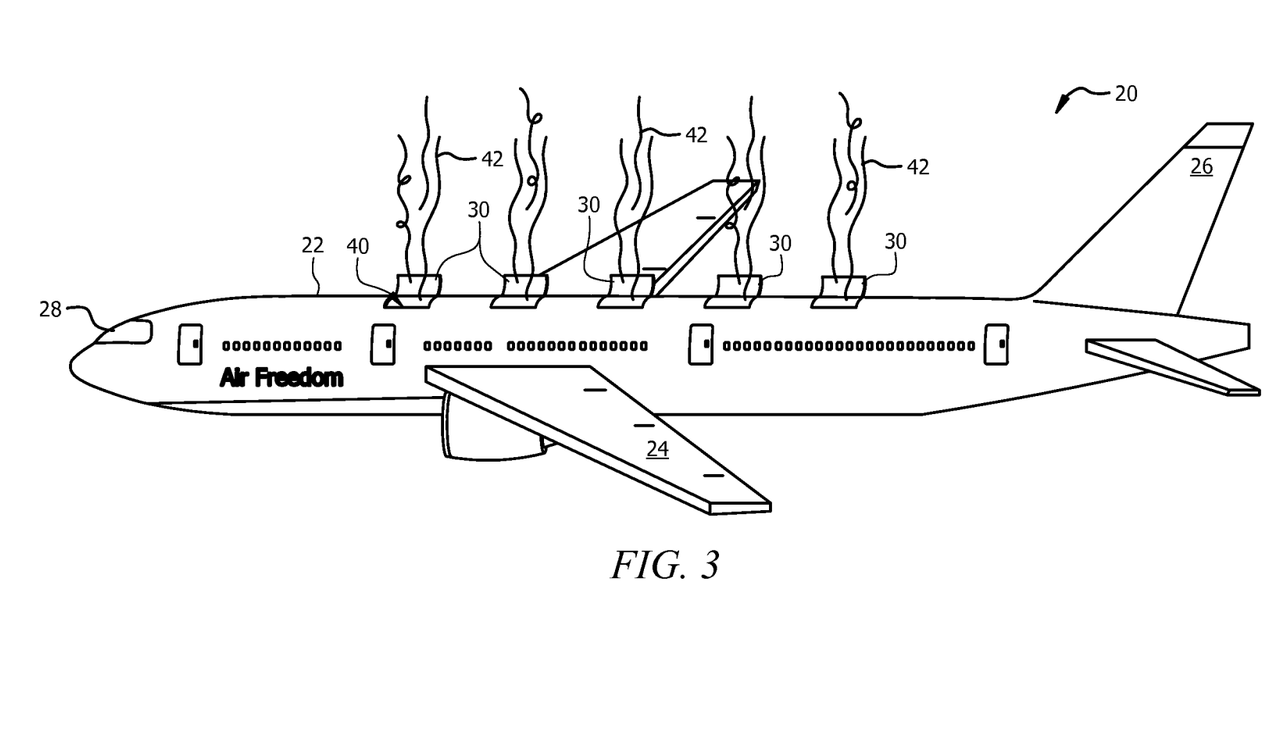
FIG. 3 illustrates the aircraft fitted with smoke exhaust shutters in an open position, exhausting smoke.

Referring to FIGS. 2 and 3, an aircraft 20 fitted with smoke exhaust shutters 30 is shown. This aircraft 20 has several exhaust shutters 30 located in the upper fuselage 22, above where the passengers are typically seated. The exhaust shutters 30 are normally held shut by locks and/or actuators so as not to open inadvertently when the aircraft 20 is underway (as shown in FIG. 2). As will be described, through manual or automatic systems and procedures, when a fire or smoke issue occurs, the exhaust shutters 30 open as shown in FIG. 3, allowing for the smoke 42 to escape through openings 40 and allowing the smoke to be replaced by outside air, providing for breathing by the passengers. Being that smoke is typically less dense than air, the preferred location for the exhaust shutters 30 is near the top of the fuselage, above the passenger cabin.

In this example, the wings 24, tail 26 and cockpit 28 are similar to those in the aircraft 10 of the prior art (see FIG. 1).

Referring to FIGS. 4, 5, 6, and 7, exhaust shutters in the closed position (FIGS. 4 and 6) and in the open position (FIGS. 5 and 7) are shown. Although many shapes, sizes and configurations of exhaust shutters 30/30a are anticipated, two exemplary exhaust shutters 30/30a are shown.

Figure 4:
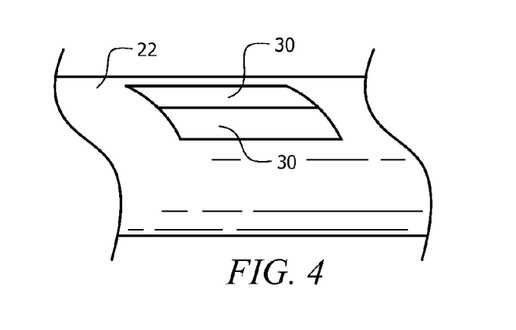
FIG. 4 illustrates a first exemplary exhaust shutter in the closed position.
Figure 5:
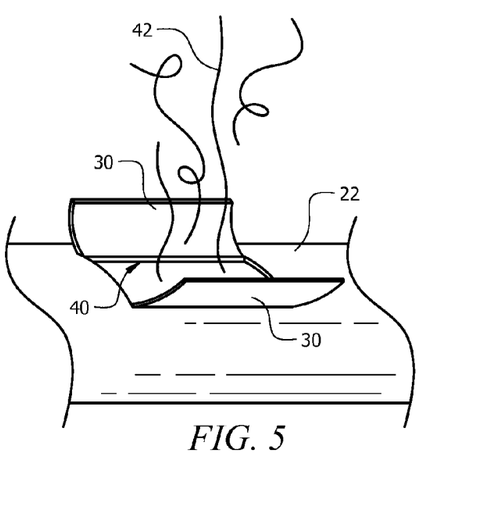
FIG. 5 illustrates the first exemplary exhaust shutter in the open position, exhausting smoke.

In FIGS. 4 and 5, lengthwise exhaust shutters 30 are show, opening along hinges that are substantially parallel to a lengthwise axis of the aircraft 20. In FIG. 4, the exhaust shutters 30 are shown closed, as would be during normal operation of the aircraft 20. In FIG. 5, the exhaust shutters 30 are shown open, allowing smoke 42 to escape.

Figure 6:
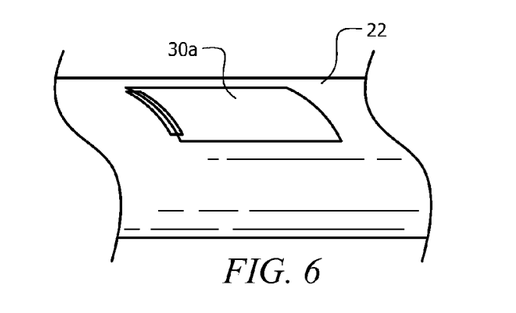
FIG. 6 illustrates a second exemplary exhaust shutter in the closed position.
Figure 7:
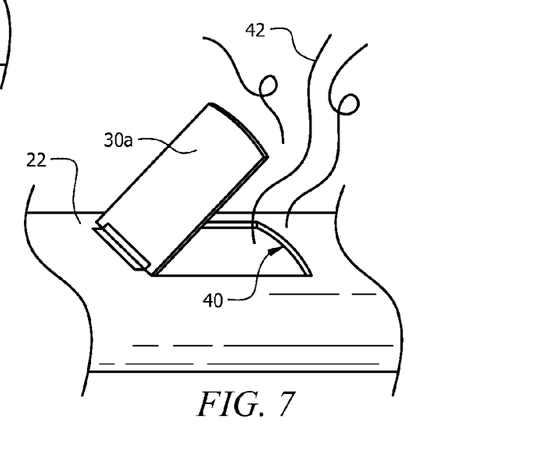
FIG. 7 illustrates the second exemplary exhaust shutter in the open position, exhausting smoke.

In FIGS. 6 and 7, hatch-like exhaust shutters 30a are show, opening along hinges that are substantially perpendicular to a lengthwise axis of the aircraft 20. In FIG. 6, the exhaust shutters 30a are shown closed, as would be during normal operation of the aircraft 20. In FIG. 7, the exhaust shutters 30a are shown open, allowing smoke 42 to escape.

It is fully anticipated and preferred that the exhaust shutters 30/30a are designed to be flush with the outer skin of the aircraft so as to reduce drag and provide the outer skin of the aircraft maximum aerodynamic smoothness. Furthermore, the hinged designs for the exhaust shutters 30/30a are but one example of a mechanism for providing air exchange between the passenger cabin and outside ambient air as many other exhaust shutter designs, shapes, and mechanisms are equally anticipated, such as sliding exhaust shutters, louvered exhaust shutters, iris-type exhaust shutters, etc.

Figure 8:
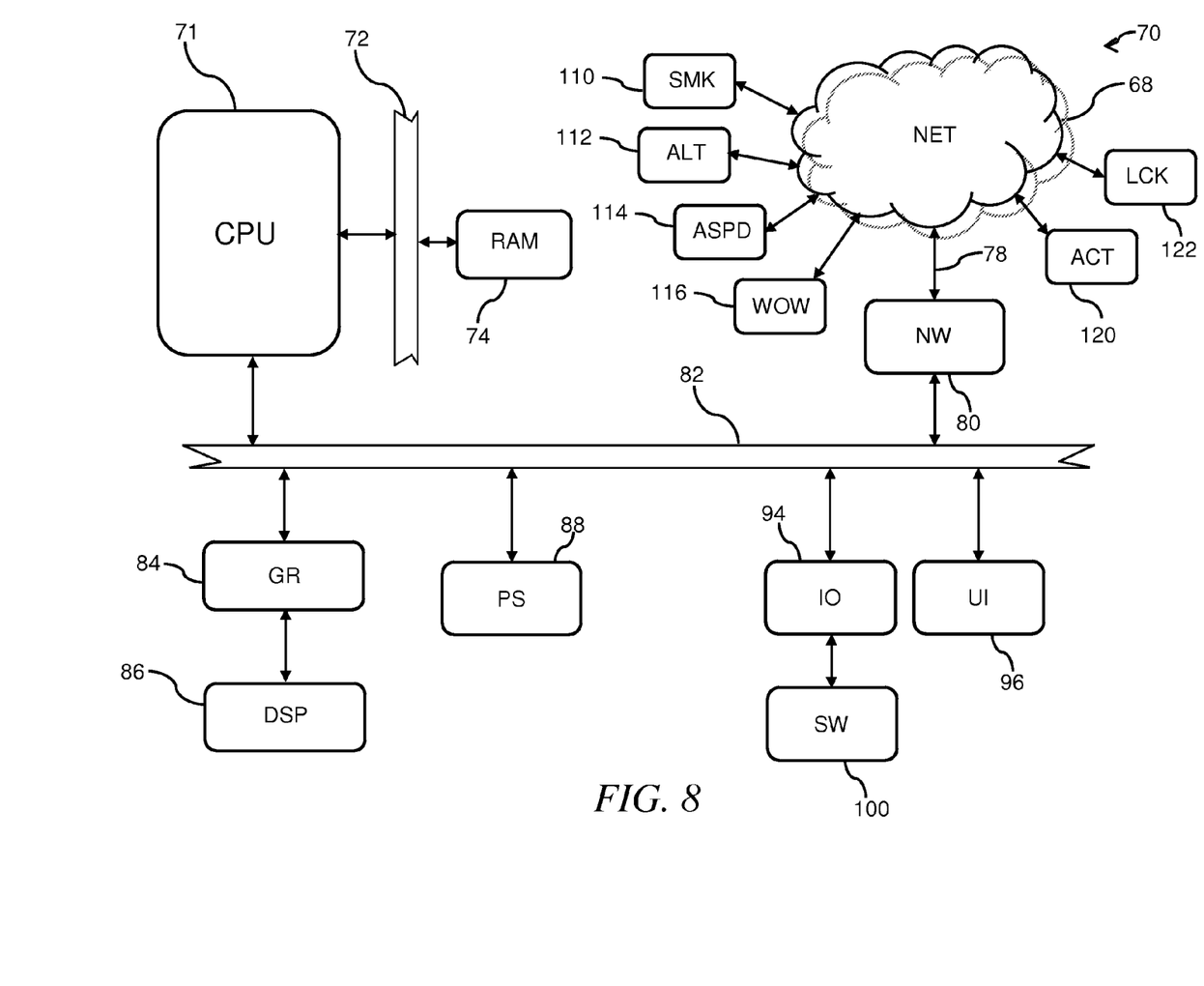
FIG. 8 illustrates a schematic view of an exemplary aircraft control system.

Referring to FIG. 8, a simplified schematic view of a typical aircraft control system 70 is shown. The exemplary aircraft control system 70 represents a typical aircraft control system, but is not intended to be operational. This exemplary aircraft control system 70 is shown in its simplest form. Different architectures are known that accomplish similar results in a similar fashion and the present invention is not limited in any way to any particular aircraft control system 70, architecture, or implementation. In this exemplary aircraft control system 70, a processor 71 executes or runs programs in a random access memory 74. The programs that control various aspects of the operation of the aircraft 20 are generally loaded into the random access memory 74 when needed. The processor 71 is any processor, suited for controlling aircraft 20. The random access memory 74 is typically connected to the processor 71 by, for example, a memory bus 72. The random access memory 74 is any memory 74 suitable for connection and operation with the selected processor 71, such as SRAM, DRAM, SDRAM, RDRAM, DDR, DDR-2, etc.

Also connected to the processor 71 is a system bus 82 for connecting to peripheral subsystems such as a network interface 80 and a graphics adapter 84. The graphics adapter 84 receives commands from the processor 70 and controls what is depicted on, for example, one or more displays 86, including images of gauges, etc.

In general, persistent storage 88 stores operating procedures, control data, programs, etc., as known in the industry.

The peripherals shown are examples and other peripherals are known in the industry such as speakers, microphones, USB interfaces, Bluetooth transceivers, Wi-Fi transceivers, image sensors, temperature sensors, etc., the likes of which are not shown for brevity and clarity reasons.

In this typical aircraft control system 70, communications with some device(s) 110/112/114/116/120/122 is performed through a networked communication system or local area network. For example, the network interface 80 connects the aircraft control system 70 to other internal systems (or remote systems) for various purposes such as updating software, downloading of data such as charts, operating actuators, receiving alarms, controlling devices, etc. Although many aircraft subsystems are typically connected through an on-board network 68, a few examples of such subsystems are shown including one or more smoke or fire detectors 110, an altimeter 112, an air speed measuring device 114, a detector measuring the weight placed on the aircraft wheels 116, one or more actuators 120 for opening the exhaust shutters 30/30a, and one or more electrically controlled locks 122 for locking the exhaust shutters 30/30a.

In this typical aircraft control system 70, communication with some device(s) 20 is performed through a direct-connect communication system, shown as an I/O port 94. Many different communication systems are anticipated and the simplified I/O port 94 is one example using any form of data communication to the aircraft 10, including, but not limited to any of the various known digital and analog interfaces such as NRZ (non-return to zero), RS-232, I2C, IIC, etc. In some embodiments, a wireless interface such as Bluetooth is also anticipated.

In general, electrical signals from the I/O port 94 communicate with devices such as a dashboard switch 100, indicators, sound-emitting devices, etc. For example, upon receiving a smoke alarm, an audible alarm within the cockpit is initiated through one or more output pins of the I/O port 94.

Aircraft control systems 70 typically have one or more user controls 96 such as foot pedals, throttles, keyboards, joysticks, etc., through which the pilot(s) typically maneuver the aircraft 20. These are not shown for brevity and clarity reasons.

Figure 9:
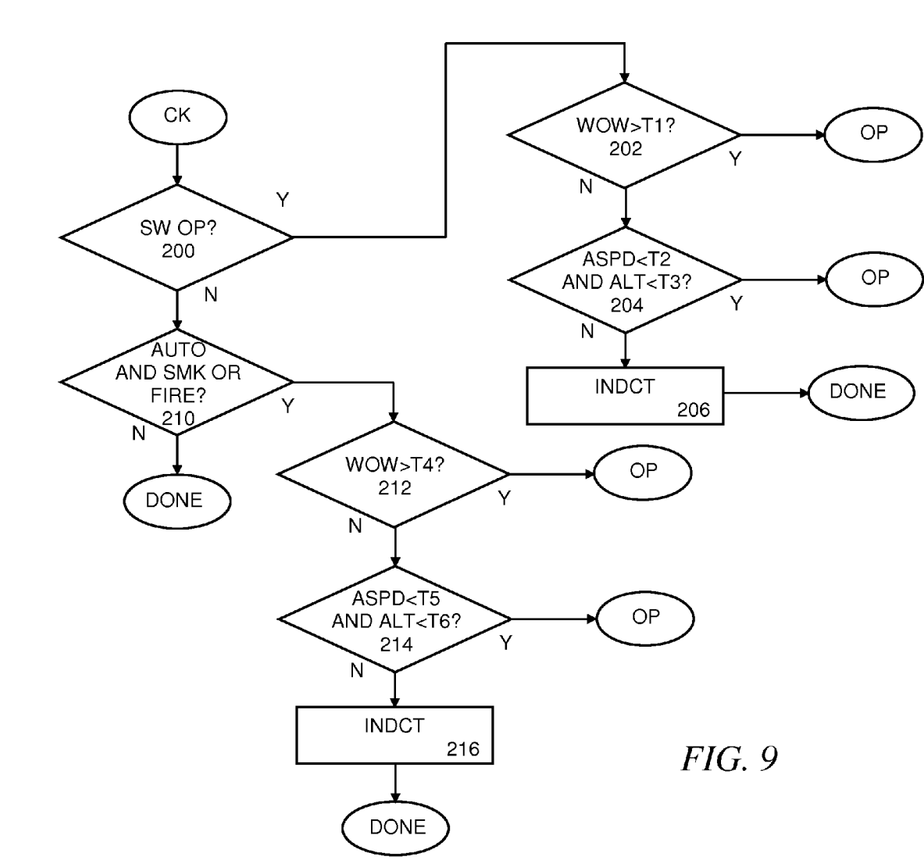
FIG. 9 illustrates a first flow chart of the exemplary aircraft control system.
Figure 10:
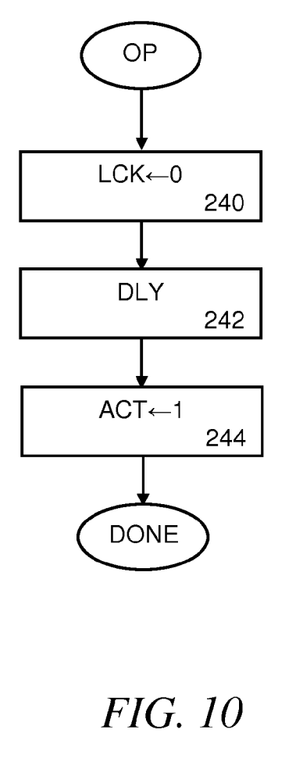
FIG. 10 illustrates a second flow chart of the exemplary aircraft control system.

Referring to FIGS. 9 and 10, flow charts of the exemplary aircraft control system are shown. The exemplary program segments depicted by the flow charts of FIGS. 9 and 10 are examples only and many other program flows are anticipated, for example, interrupt driven or polled. In this example, the flows shown in FIGS. 9 and 10 are periodically initiated, either by polling or interrupt systems depending upon the overall control system.

The exemplary flow starts with checking 200 the status of a switch 100. As is known, most cockpit dashboards have many different switches to initiate various activities such as changing lighting, enabling/disabling certain functions, etc. In this example, a new switch 100 is added to the dashboard for initiating opening of the exhaust shutters 30/30a. Although depicted as a simple switch 100, which in a first position indicates the exhaust shutters 30/30a are to remain closed and in a second position indicates the exhaust shutters 30/30a need to open, a more complex switch 100 is also anticipated. An example of a more complex switch 100 is one that requires two-hand operation (e.g. left hand lifts one lever and right hand lifts another lever), thereby reducing the possibility of inadvertent activation, which is not very satisfying to air travelers.

If the switch 100 has been activated 200, tests 202/204 are performed to make sure that it is safe to open the exhaust shutters 30/30a. For example, it is not safe to open the exhaust shutters when in the air, at certain altitudes, at certain air speeds, at certain ground speeds, etc. For example, if the weight-on-wheels sensor 116 indicates 202 that there is more weight on the wheels than a pre-determined threshold, T1 (e.g. the aircraft 20 is on the ground), then the exhaust shutters 30/30a are operated (see FIG. 10). If there is insufficient weight on the wheels 202, but the air speed read from the air speed sensor 114 is less than a pre-determined threshold T2 and the altitude read from the altitude sensor 112 is less than another pre-determined threshold T3 204, then the exhaust shutters 30/30a are operated (see FIG. 10). For example, if the aircraft 20 is traveling less than 200 knots per hour and the altitude is less than 100 feet above the ground level, then the exhaust shutters 30/30a are operated (see FIG. 10). If the air speed is not less than a pre-determined threshold T2 or the altitude is not less than another pre-determined threshold T3, then there is no operation of the exhaust shutters 30/30a and an indication is made 206 such as a sound is emitted or an indicator light is flashed, etc.

If the switch 100 has not been activated 200, a test is made to determine if operation of the exhaust shutters 30/30a has been set to automatic and there is an indication of either smoke or fire 210. If operation of the exhaust shutters 30/30a has been set to automatic and there is an indication of either smoke or fire 210, then tests 212/214 are performed to make sure that it is safe to open the exhaust shutters 30/30a. For example, if the weight-on-wheels sensor 116 indicates 212 that there is more weight on the wheels than a pre-determined threshold, T1 (e.g. the aircraft 20 is on the ground), then the exhaust shutters 30/30a are operated (see FIG. 10). If there is insufficient weight on the wheels 212, but the air speed read from the air speed sensor 114 is less than a pre-determined threshold T2 and the altitude read from the altitude sensor 112 is less than another pre-determined threshold T3 214, then the exhaust shutters 30/30a are operated (see FIG. 10). For example, if the aircraft 20 is traveling less than 200 knots per hour and the altitude is less than 100 feet above the ground level, then the exhaust shutters 30/30a are operated (see FIG. 10). If the air speed is not less than a pre-determined threshold T2 or the altitude is not less than another pre-determined threshold T3 214, then there is no operation of the exhaust shutters 30/30a and an indication is made 216 such as flashing of an indicator light, etc.

In FIG. 10, the steps for opening the exhaust shutters 30/30a per one particular embodiment are shown. In this embodiment, the exhaust shutters 30/30a each have both a lock 122 (see FIG. 11) and an actuator 120 (see FIG. 11). The actuator 120 slowly opens the exhaust shutters 30/30a under electrical control after the lock 122 is deactivated. The first step in opening the exhaust shutters 30/30a is to deactivate 240 the lock 122. In some embodiments, a delay 242 is taken to wait for the electro-mechanical lock to deactivate, then the actuator 120 is activated 244. The actuator then slowly moves the exhaust shutters 30/30a to an open position.

In some embodiments (see FIG. 12), there is no actuator 120 and, instead, the exhaust shutters 30/30a are biased to the open position by, for example, a spring 123 and held closed by the lock 122. In this embodiment, application of an electrical signal to the lock 122 disengages the lock, allowing the exhaust shutters 30/30a to be moved into the open position by force of the springs.

Figure 11:
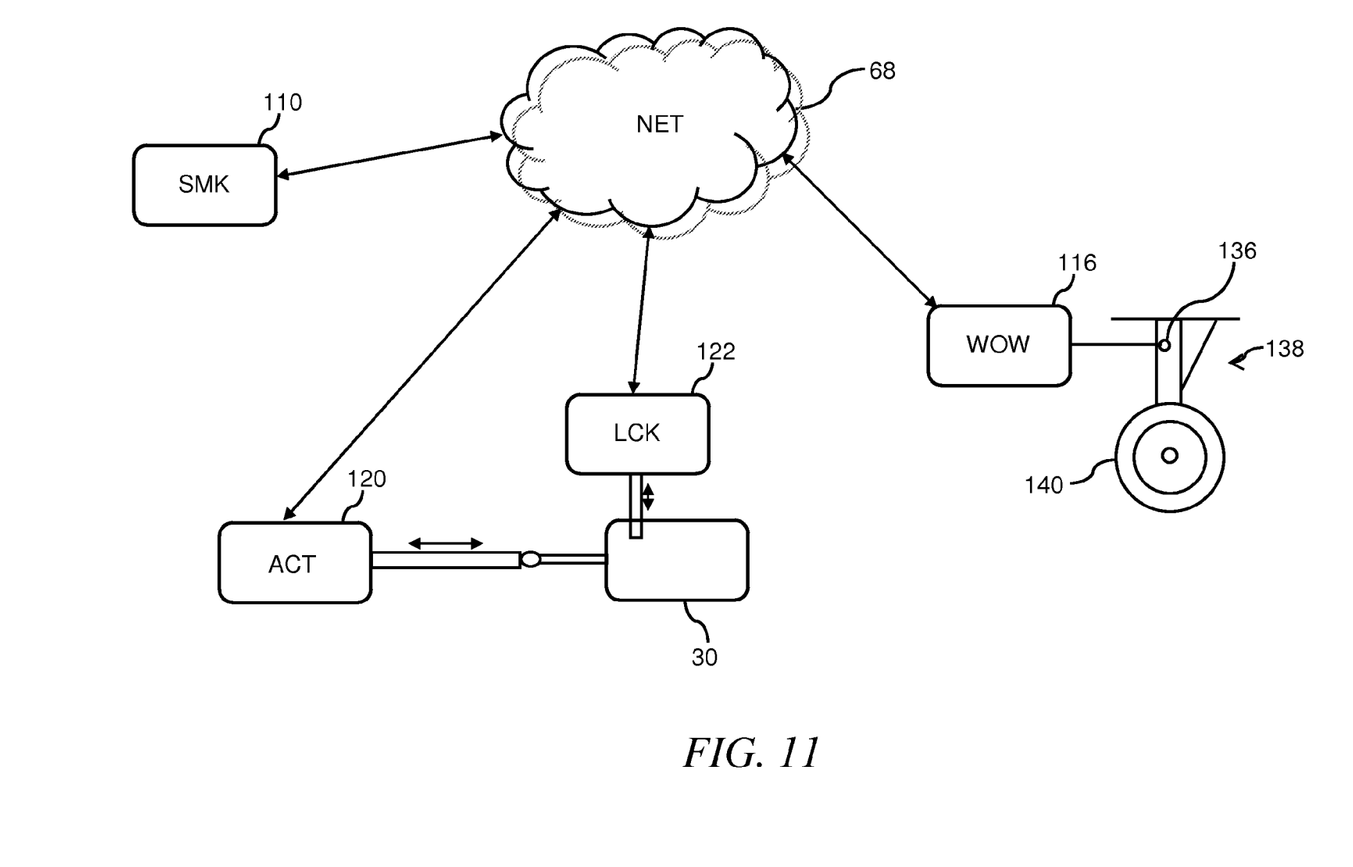
FIG. 11 illustrates a schematic view of part of the exemplary aircraft control system.
Figure 12:
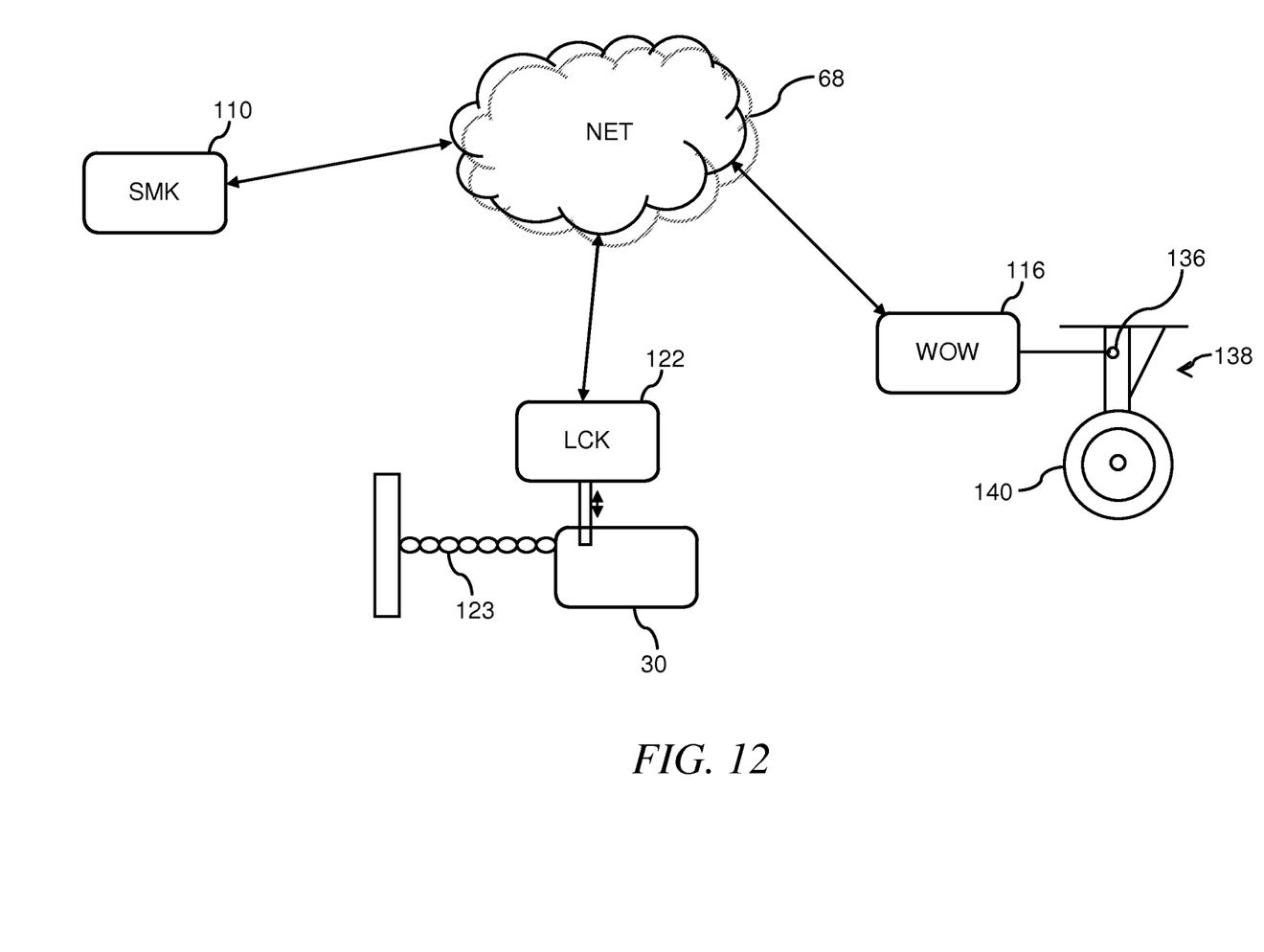
FIG. 12 illustrates a second schematic view of part of the exemplary aircraft control system.

Referring to FIGS. 11 and 12, schematic views of portions of the exemplary aircraft control system are shown. In FIG. 11, an actuator 120 is used to move the exhaust shutters 30/30a between an open and closed position while in FIG. 12, the exhaust shutters 30/30a are biased into the open position by one or more springs 123.

In the system of FIG. 11, the exhaust shutters 30/30a are moved into the closed position, by operation of the actuator(s) 120 and the lock(s) 122 engage to hold the exhaust shutters 30/30a in the closed position. The exhaust shutters 30/30a are opened by releasing the lock(s) 122 and operating the actuator in a reverse fashion.

In the system of FIG. 12, the exhaust shutters 30/30a are pushed into the closed position, overcoming the force of the spring(s) 123 and the locks 122 engaged to hold the exhaust shutters 30/30a in the closed position. The exhaust shutters 30/30a are opened by releasing the lock(s) 122 and the spring(s) 123 then urge the exhaust shutters 30/30a into the open position.

Both FIG. 11 and FIG. 12 show interaction between the smoke detector 110 and the weight-on-wheels detector 116. The smoke detector 110 signals when there is smoke present. The weight-on-wheels detector 116 reads a sensor 136 that is associated with the landing gear 138 such that, when the aircraft 20 is on the ground (e.g. the wheels 140 rest on the ground), the force generated by the weight of the aircraft 20 on the landing gear 138 and wheels 140 is translated into an electrical signal by the sensor 136 and relayed to the control system 70 through, for example, the network 68.

In operation (automatic mode), when smoke is detected by the smoke detector 110 and sufficient weight is detected by the weight-on-wheels detector 116, in the system of FIG. 11, the lock 122 is disengaged then the actuator operated to open the exhaust shutters 30/30a. In the system of FIG. 12, the lock 122 is disengaged and force of the springs 123 open the exhaust shutters 30/30a.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A smoke mitigation system for an aircraft, the smoke mitigation system comprising:
an exhaust shutter in an upper region of a fuselage of the aircraft, the upper region being on an opposite side of the fuselage than a landing gear, the exhaust shutter having a closed position in which the exhaust shutter does not allow an exchange of air from outside of the fuselage with air inside of a passenger cabin within the fuselage, and the exhaust shutter having an open position in which the exhaust shutter allows the exchange air from the outside of the fuselage with the air/smoke from inside of the passenger cabin, thereby enabling escape of the smoke from the passenger cabin;
means for opening the exhaust shutter; and
means for initiating opening of the exhaust shutter; wherein the means for initiating opening of the exhaust shutter is triggered by detection of smoke coupled with both a signal indicating that the aircraft is traveling at an airspeed of less than a maximum allowable airspeed and a signal indicating that the aircraft is at an altitude above ground level that is less than a maximum allowable altitude above the ground level.

2. The smoke mitigation system of claim 1, wherein the means for opening and closing the exhaust shutter comprises a resilient member coupled to the exhaust shutter, the resilient members urging the exhaust shutter into the open position, the exhaust shutter held in the closed position by an electrically controlled lock whereas release of the electrically controlled lock allows the resilient member to move the exhaust shutter to the open position.

3. The smoke mitigation system of claim 1, wherein the means for opening and closing the exhaust shutter comprises an actuator coupled to the exhaust shutter, the actuator configured to move the exhaust shutter between the closed position and the open position.

4. The smoke mitigation system of claim 3, further comprising an electrically controlled lock whereas release of the electrically controlled lock allows the actuator to move the exhaust shutter from the closed position to the open position.

5. The smoke mitigation system of claim 1, wherein the means for initiating opening of the exhaust shutter is a manual switch operated by an operator of the aircraft.

6. The smoke mitigation system of claim 1, wherein the means for initiating opening of the exhaust shutter is a manual switch operated by an operator of the aircraft and a signal indicating that the aircraft is on the ground as detected by a sensor, the sensor indicating at least a minimum required amount of weight on the landing wheels of the aircraft.

7. The smoke mitigation system of claim 1, wherein the means for initiating opening of the exhaust shutter is a manual switch operated by an operator of the aircraft and a signal indicating that the aircraft is traveling at an airspeed of less than a maximum allowable airspeed and a signal indicating that the aircraft is at an altitude above ground level that is less than a maximum allowable altitude above the ground level.

8. A method of mitigating smoke within an aircraft, the method comprising:
upon detecting smoke in the aircraft:
waiting for the aircraft to be at a location that is safe to deploy one or more exhaust shutters, the exhaust shutters in an upper region of a fuselage of the aircraft and the exhaust shutters in fluid communication with a passenger cabin of the aircraft;
initiating opening of the exhaust shutters, thereby the smoke escaping through the exhaust shutters and fresh air entering the passenger cabin through the exhaust shutters; wherein the step of waiting includes determining that the aircraft is in a location that is safe to deploy the one or more exhaust shutters by detecting sufficient weight on the aircraft's landing gear.

9. The method of claim 8, wherein the step of waiting further includes determining that the aircraft is in a location that is safe to deploy the one or more exhaust shutters by detecting that an airspeed of the aircraft being less than a predetermined maximum deployment airspeed.

10. The method of claim 8, wherein the step of waiting further includes determining that the aircraft is in a location that is safe to deploy the one or more exhaust shutters by detecting that an altitude of the aircraft above land is less than a predetermined maximum altitude above land.

11. The method of claim 8, wherein the step of waiting further includes determining that the aircraft is in a location that is safe to deploy the one or more exhaust shutters by detecting that an airspeed of the aircraft is less than a predetermined maximum deployment airspeed and an altitude of the aircraft above land is less than a predetermined maximum altitude above land.

12. An apparatus for smoke mitigation in an aircraft, the apparatus comprising:
   a plurality of exhaust shutters in an upper region of a fuselage of the aircraft, the upper region being on an opposite side of the fuselage than a landing gear, the exhaust shutters having a closed position in which each of the exhaust shutters does not exchange air from outside of the fuselage with air inside of a passenger cabin within the fuselage, and the exhaust shutters having an open position in which each of the exhaust shutters exchange air from the outside of the fuselage with air inside of the passenger cabin, thereby enabling escape of smoke from the passenger cabin;
   each of the exhaust shutters interfaced to an actuator, the actuators configured to open a respective exhaust shutter; and
   means for initiating operation of the actuators, thereby opening of the exhaust shutters;
   wherein the means for initiating operation of the actuators is triggered by an occurrence of any of the group consisting of:
      a combination of a signal from a smoke detector and a signal indicating the aircraft is on the ground as detected by a sensor, the sensor indicating at least a minimum required amount of weight on the landing wheels of the aircraft,
      a manual switch operated by an operator of the aircraft in conjunction with both an electrical signal indicating the aircraft is traveling at an airspeed of less than a maximum allowable airspeed and an electrical signal indicating that the aircraft is at an altitude above ground level that is less than a maximum allowable altitude above the ground level,
      a combination of a signal from a smoke detector and a signal indicating the aircraft is on the ground as detected by a sensor, the sensor indicating at least a minimum required amount of weight on the landing wheels of the aircraft, and
      a combination of a signal from a smoke detector, a signal indicating the aircraft is traveling at an airspeed of less than a maximum allowable airspeed, and a signal indicating that the aircraft is at an altitude above ground level that is less than a maximum allowable altitude above the ground level.

13. The apparatus of claim 12, wherein each exhaust shutter further comprises a lock, each lock preventing opening of a respective exhaust shutter until unlocked by a signal indicating the aircraft is at a safe altitude and speed.

\* \* \* \* \*